Dec. 18, 1934.  F. J. SHOOK  1,984,768
VULCANIZER
Filed Oct. 8, 1931  8 Sheets-Sheet 4

INVENTOR
FLORAIN J. SHOOK
BY
Ely & Barrow
ATTORNEYS

Dec. 18, 1934.　　　F. J. SHOOK　　　1,984,768
VULCANIZER
Filed Oct. 8, 1931　　　8 Sheets-Sheet 5

INVENTOR
FLORAIN J. SHOOK

BY

ATTORNEYS

Dec. 18, 1934.  F. J. SHOOK  1,984,768

VULCANIZER

Filed Oct. 8, 1931  8 Sheets-Sheet 6

INVENTOR
FLORAIN J. SHOOK

BY  Ely & Barrow

ATTORNEYS

Dec. 18, 1934.  F. J. SHOOK  1,984,768
VULCANIZER
Filed Oct. 8, 1931  8 Sheets-Sheet 8

INVENTOR
FLORAIN J. SHOOK
BY
Ely & Barrow
ATTORNEYS

Patented Dec. 18, 1934

1,984,768

UNITED STATES PATENT OFFICE 1,984,768

VULCANIZER

Florain J. Shook, Akron, Ohio, assignor to National Rubber Machinery Company, Akron, Ohio, a corporation of Ohio Application October 8, 1931, Serial No. 567,530

7 Claims. (Cl. 18—17)

This invention relates to vulcanizers, and more especially it relates to the unit type of vulcanizers commonly termed "watchcase vulcanizers."

Vulcanizers of the character mentioned are largely used in the manufacture of pneumatic tire casings and inner tubes therefor, and for convenience and simplicity of structure many of such vulcanizers have been provided with locking means positioned at the axis of the vulcanizer. In the manufacture of tires for aeroplane wheels, the relatively small bead diameter of the tires makes it impractical to use axial mold-locking means, so that the latter requires to be disposed exteriorly of the vulcanizer.

The chief objects of this invention are to provide a vulcanizer having improved locking means positioned exteriorly thereof; to provide power means for operating the said locking means in determinate timed relation to the opening and closing of the vulcanizer; to provide improved means for holding the work in one-half of a mold while the other mold half is withdrawn; to provide for utilizing the said work-holding means to strip the work from the first-mentioned mold member; to provide for ventilating and cooling a fluid pressure diaphragm that is used for effecting axial movement of one of the mold members to cause complete closing of the mold; to provide means for limiting the axial movement of the axially-movable mold member upon occasion, such as when the work is being stripped therefrom; and to provide means for quickly and accurately adjusting the angular position of one of the mold members so that it registers accurately with the other mold member. Other objects will be manifest.

Of the accompanying drawings.

Figure 1:
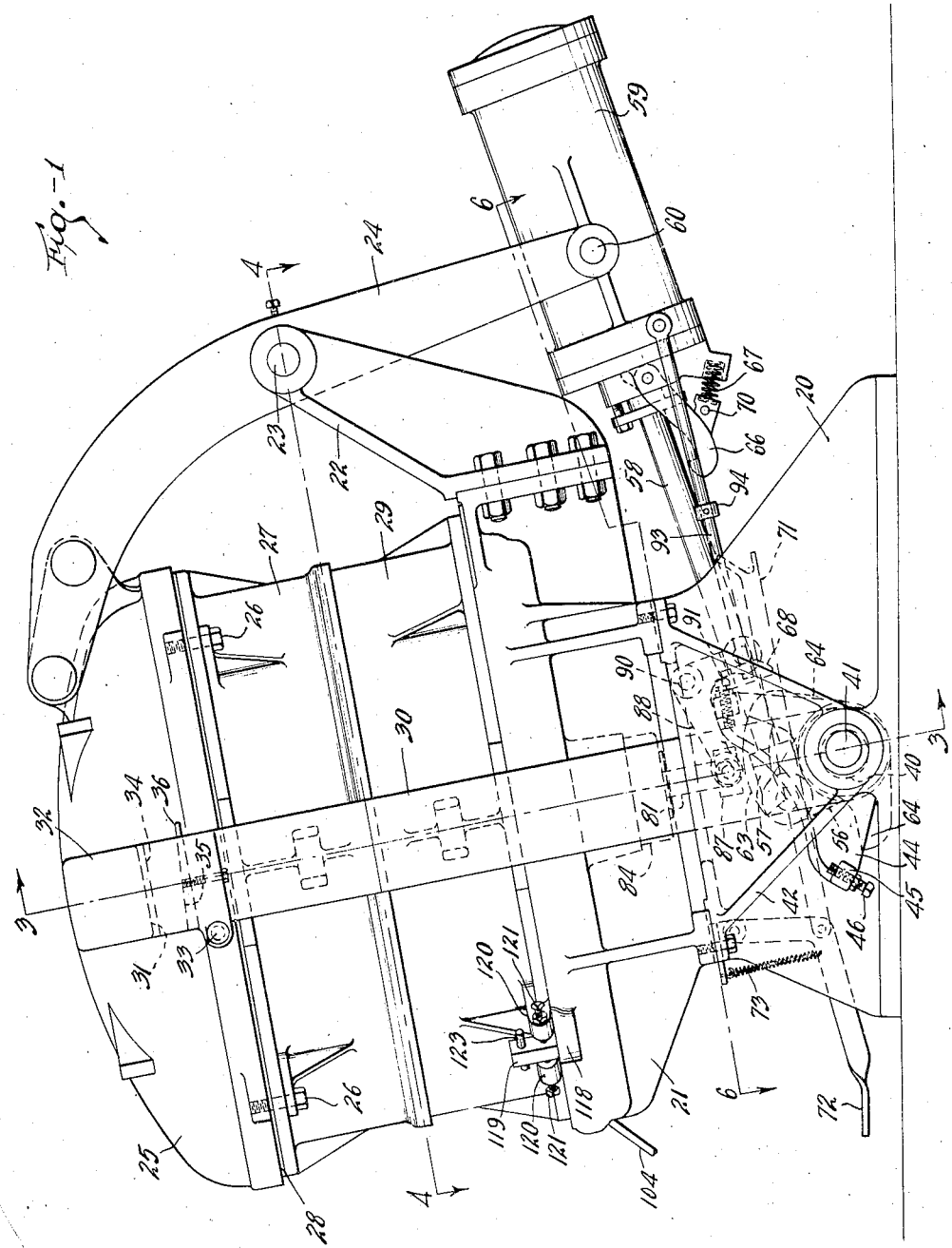
Figure 1 is a side elevation of a vulcanizer embodying the invention in its preferred form, in closed or operative position.
Figure 2:
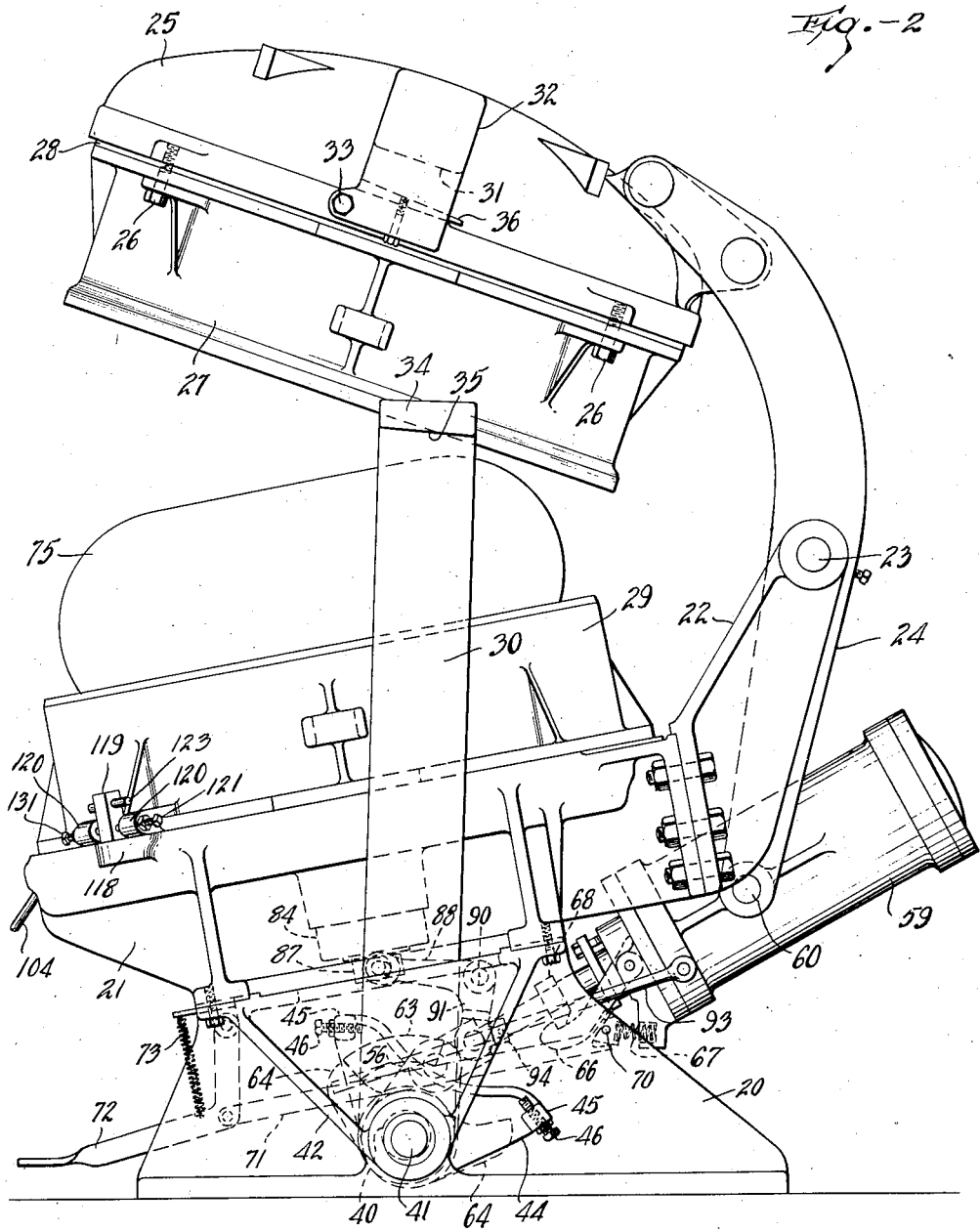
Figure 2 is a similar view of the vulcanizer in its open position.
Figure 9:
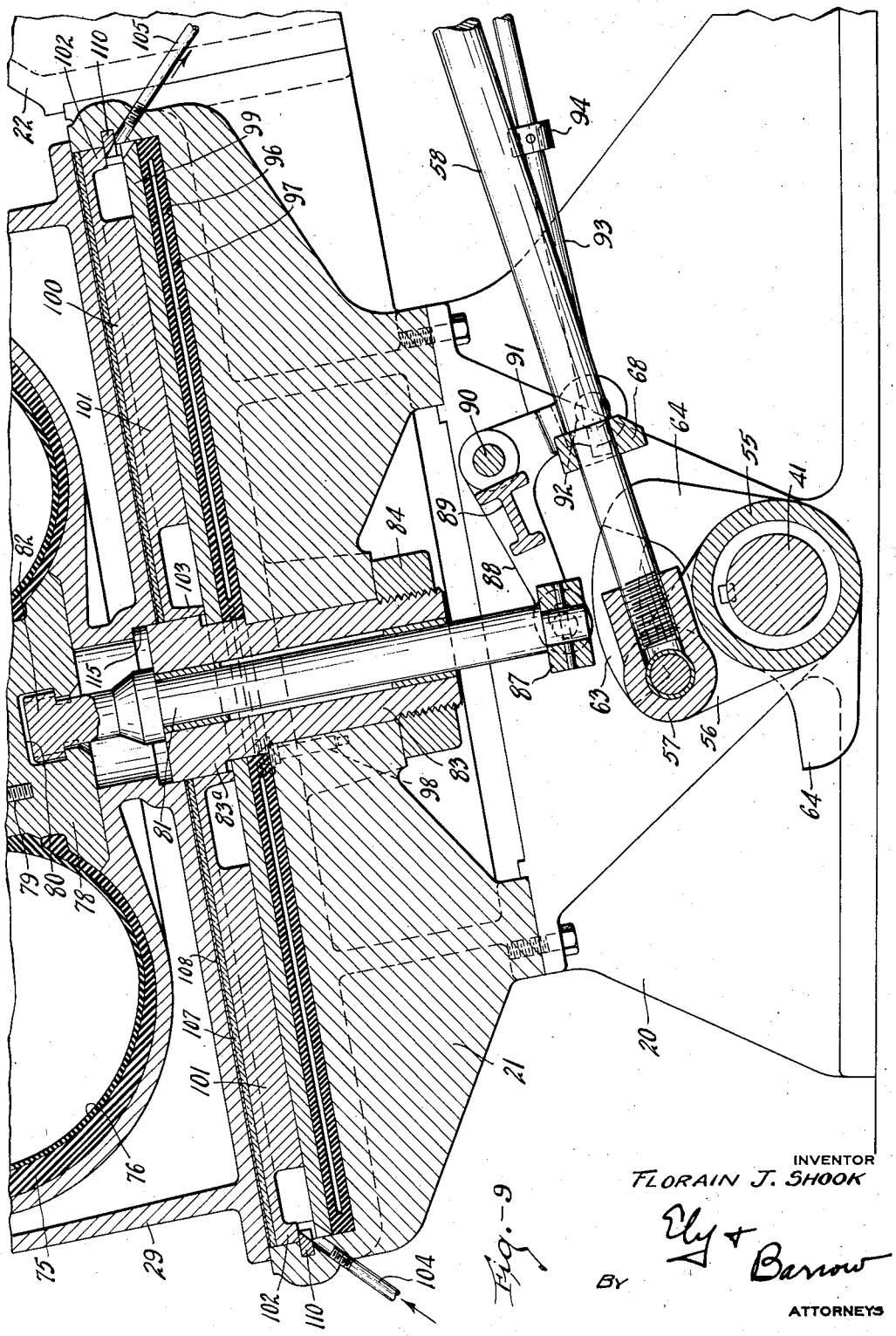
Figure 9 is a section on the lines 9—9 of Figures 3 and 4.
Figure 10:
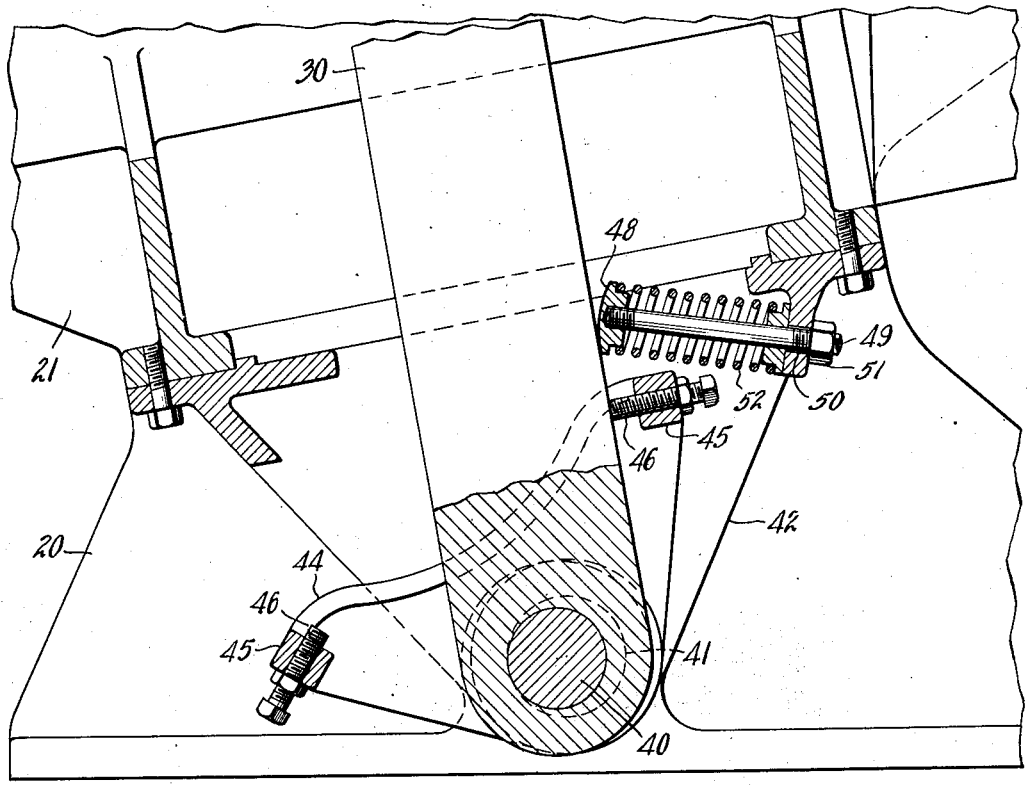
Figure 10 is a section on the lines 10—10 of Figures 3 and 4.

Referring to the drawings, 20, 20 are low, spaced apart standards or base members upon which a stationary lower platen 21 is fixedly mounted, the standards 20 being so shaped that the platen is somewhat downwardly inclined toward the front of the vulcanizer, which is at the left as viewed in Figures 1, 2 and 9. Secured to the rear portion of the platen 21 is a pair of spaced-apart bracket arms 22, 22 that extend upwardly and rearwardly and have their free end portions formed as journals for the end portions of a hinge pin 23. The latter constitutes a support and fulcrum for a pair of arms 24, 24, the lower ends of which are connected to power means subsequently to be described, and the upper ends of which carry a hollow upper platen 25. Secured to the lower face of the platen 25 by bolts 26, 26 is a steam-jacketed mold half 27, there being a layer of heat-insulating material 28 interposed between the said platen and mold section. A complemental steam-jacketed, lower mold section 29 is supported upon the upper side of the lower platen 21, provision being made for effecting limited axial movement of the said lower mold section as will subsequently be described. Suitable connections (not shown) are provided for conducting heated fluid, such as steam, to the steam chambers of the mold sections.

For locking the mold sections together in their juxtaposed operative or vulcanizing position there is provided a pair of locking arms 30, 30 that are pivotally mounted upon opposite sides of the vulcanizer exteriorly thereof, and are angularly movable to cause their free upper end portions to engage and/or disengage with suitable formations on opposite sides of the upper platen 25. Said formations comprise undercut slots 31, 31 that are formed in the bottom sides of respective outstanding ears or lugs 32, 32 (see Figure 3) formed integral with platen 25, said slots having their rear ends open, and having their front ends traversed by respective stop members or bolts, such as the bolt 33, Figures 1 and 2, which bolts limit the forward movement of the locking bars 30 in said slots. The upper end portions of the respective locking bars 30 are formed with T-shaped heads 34, the bottom faces 35 of which are slightly tapered so that the heads are of less thickness at the front. In the closed and locked position of the vulcanizer shown in Figures 1 and 3, the tapered faces 35 of the heads 34 engage complementally tapered wear-plates 36, 36 mounted in the undercut portions of the slots 31, the arrangement being such that a downward wedging action is exerted upon the upper platen by movement of the heads 34 of the locking bars into the slots 31. The slots 31 are of such depth as to provide substantial clearance for the tops of the locking bars.

At their lower ends the locking bars 30 are journaled upon eccentrically disposed portions 40, 40 of a rock shaft 41 that is journaled in the base members 20, 20, and in outboard bearing brackets 42, 42 that are secured to the lower platen 21 at opposite sides thereof, outside the locking bars 30. For moving the locking bars angularly to and from locking position, swing-levers 44, 44 are mounted upon the rock shaft 41 beside the respective locking bars, each of said swing-levers having laterally extending portions 45, 45 that are positioned respectively in front of and behind the adjacent locking bar, and respective adjustable contact studs 46, 46 are threaded through the lateral extensions 45 so that swinging movement of the locking bars can be accurately timed. The position of the contact studs 46 with relation to the locking bar is such as to provide substantial lost motion of the swinging lever, when the rock shaft 41 is rocked, before the forward stud 46 engages the locking bar to swing it rearwardly to unlocked position, and the eccentric portion 40 of the rock shaft 41 is so angularly disposed as to lift the locking bar during the said lost motion interval whereby the lower face 35 of the locking-bar-head 34 is lifted off the wear plates 36.

The arrangement conserves power and assures the positive unlocking of the vulcanizer before power is applied to open the same. Mounted upon each outboard bearing bracket 42, behind the locking bar 30, is a yielding member that engages the locking bar and lightly urges it toward locking position. Said yielding member comprises a head 48, a stem 49 extending rearwardly from said head through an aperture 50 in the outboard bracket 42, a nut 51 on the stem that retains it in the aperture 50, and a compression spring 52 on the stem engaging the rear of the head 48. The yielding member is compressed when the locking bar is in unlocking position, and it serves the purpose of moving the locking bar to locking position, before the locking bar is engaged by the swinging lever 44, and before the eccentric 40 has moved the locking bar downwardly sufficiently to cause its head to engage the wear plates 36.

Figure 6:
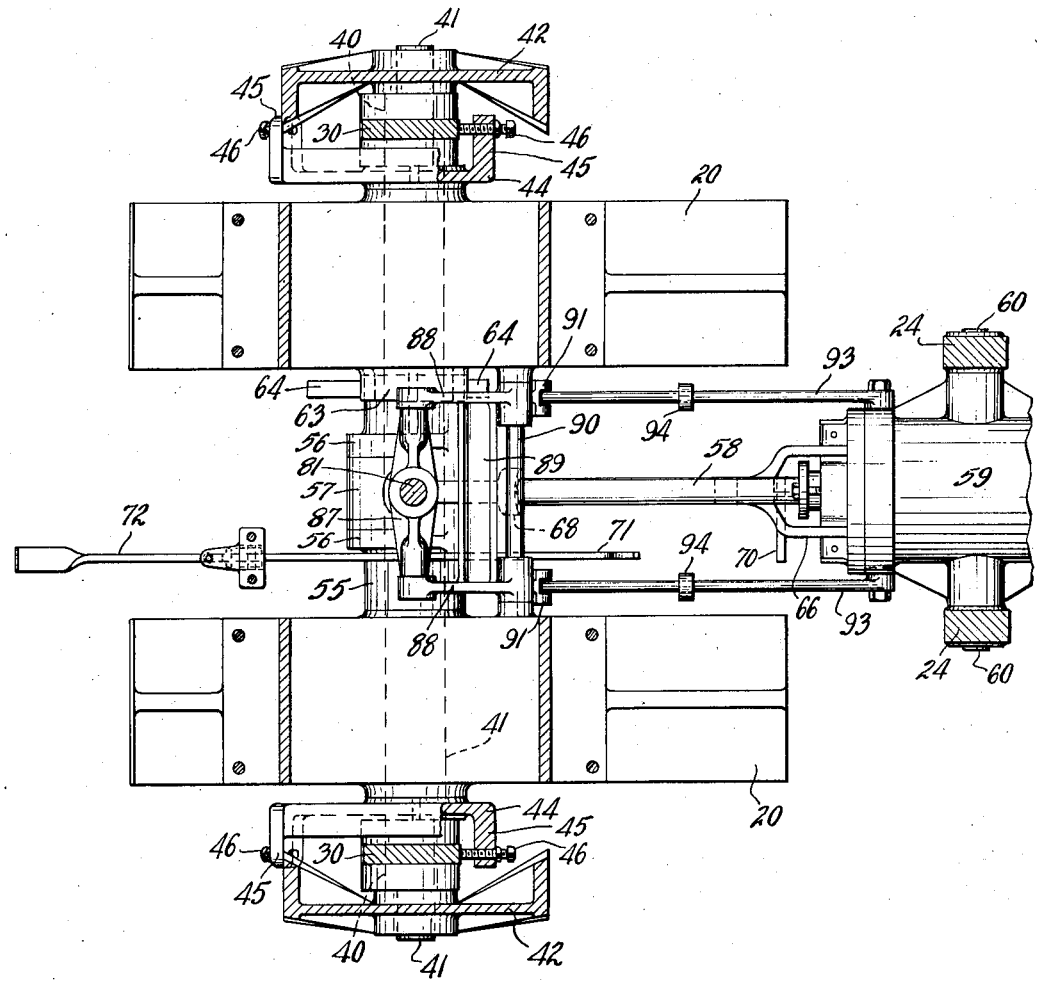
Figure 6 is a section on the lines 6—6 of Figures 1 and 3.

For rotating the rock shaft 41, the medial portion thereof, between the base members 20, has mounted thereon a sleeve 55 that is formed with a pair of radial arms 56, 56 to the free ends of which is pivotally connected a cross-head 57 that is mounted upon the outer end of the piston rod 58 of a double-acting fluid pressure operated cylinder 59, the latter being pivotally mounted at 60 in the lower ends of the arms 24. Angular movement of the rock shaft 41 is determinately limited by an arcuate lug 63, best shown in Figures 3 and 6, that projects laterally from the inner lateral face of one of the base members 20 into the orbit of a pair of arms 64, 64 projecting from the sleeve 55 at one end thereof, the lugs 63 being disposed between the arms 64 so as to be engaged by the latter upon determinate angular movement of the sleeve 55 and rock shaft 41. Suitable inlet-and-outlet pipes (not shown) are provided for conducting pressure fluid to opposite ends of the cylinder 59, and for venting it therefrom.

The arrangement is such that when the vulcanizer is closed and locked as shown in Figure 1, pressure fluid admitted to the front end of the cylinder 59 will cause the piston rod 58 thereof to retract and thus rock the rock shaft 41 to move the locking bars 30 rearwardly until one of the arms 64 engages the lug 63. This prevents further relative movement of the piston rod and rock shaft, but continued relative movement of the piston rod and the cylinder 59 causes the latter to move forwardly along the piston rod and thereby to lift the upper platen 25 to the open position shown in Figure 2 through the agency of the arms 24.

The vulcanizer is loaded and unloaded while in the open position shown in Figure 2, and to hold the upper platen 25 positively in raised position against failure or leakage of fluid pressure in the cylinder 59, a latch 66 is pivotally mounted upon the front end of the cylinder 59 and normally urged toward latching position by a compression spring 67 mounted behind it. A collar 68 is secured upon the piston rod 58 in such position as to be engaged by the latch 66 when the piston rod is fully retracted. The latch 66 prevents any forward movement of the piston or backward movement of the cylinder 59, and requires to be manually released before the vulcanizer can be closed. For so releasing the latch 66, a stud 70 is mounted on the latch and projects laterally therefrom, and in the open position of the vulcanizer said stud is disposed within the forked end portion of a trip bar 71 that rests upon the sleeve 55 and has its forward end connected to an angular foot lever 72 that is pivotally mounted upon the under side of the lower platen 21, a tension spring 73 normally holding the foot lever in raised position. Depressing of the foot lever 72 moves the trip bar 71 rearwardly to push the latch 66 downwardly out of engagement with the collar 68 of the piston rod 58.

Figure 3:
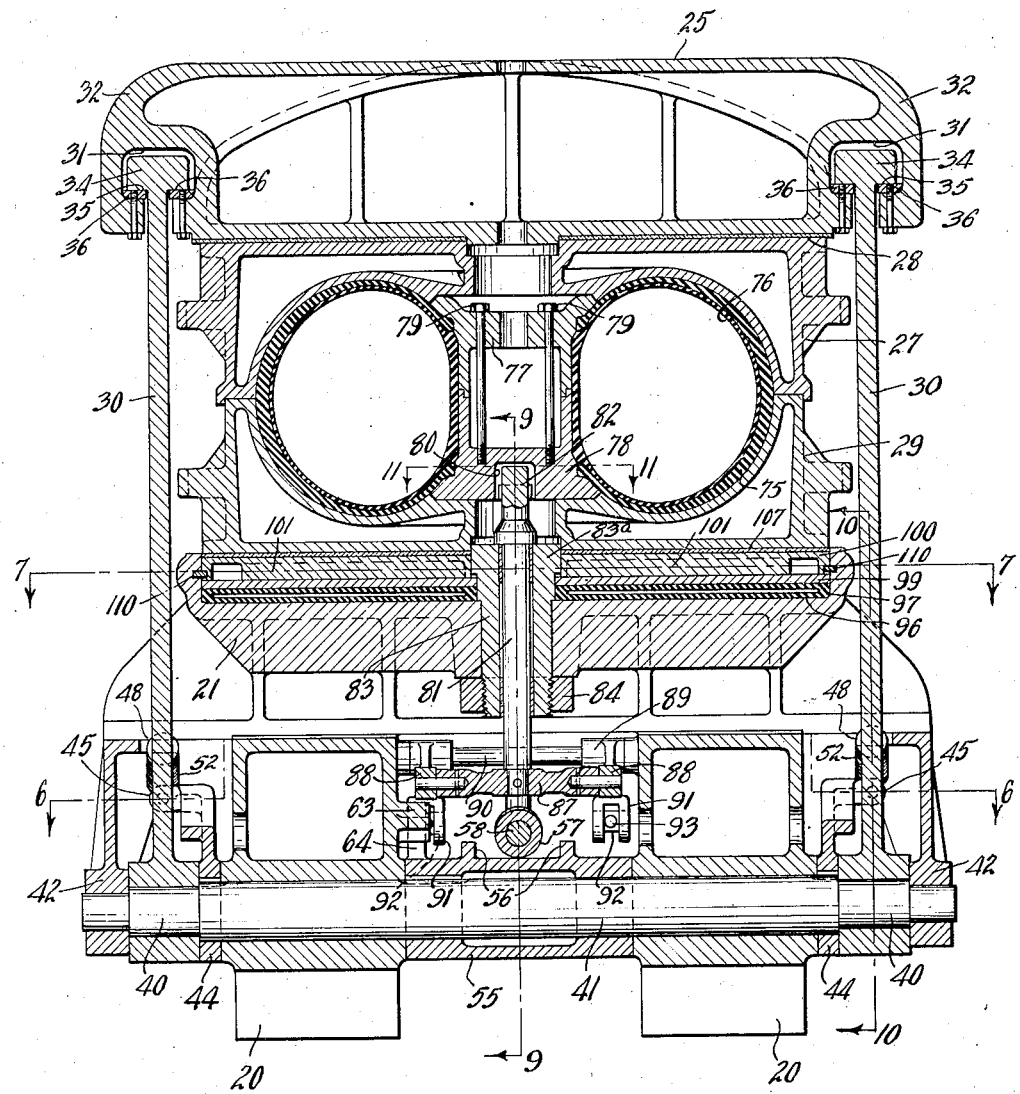
Figure 3 is a vertical section of the vulcanizer taken on the line 3—3 of Figure 1.
Figure 4:
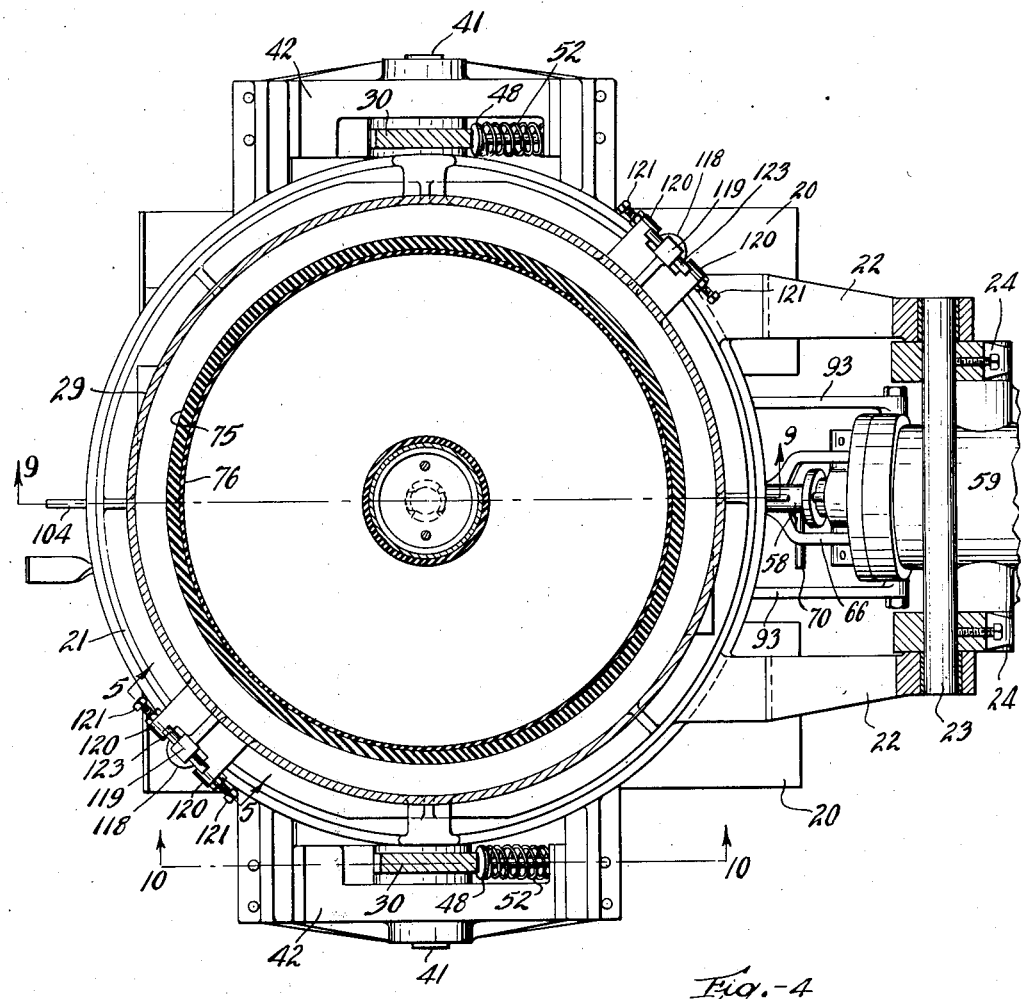
Figure 4 is a section on the line 4—4 of Figure 1.
Figure 5:
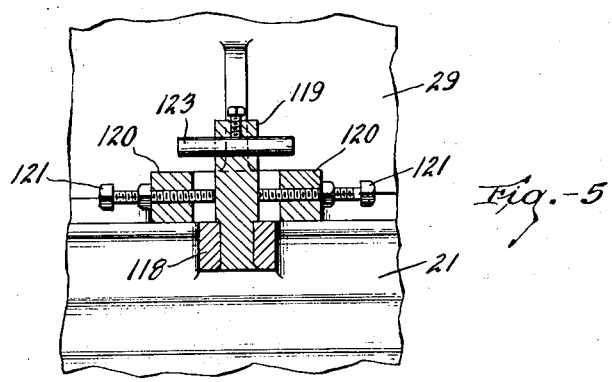
Figure 5 is a section on the line 5—5 of Figure 4.

As is most clearly shown in Figures 3 and 9, the work consists of an aeroplane tire 75 having the usual relatively small bead diameter as compared to its outside diameter. The drawings also show an expansible core 76 mounted within the tire 75, the usual inflating means (not shown) being provided for conducting pressure fluid to the expansible core. The tire-molding cavities are cut away as shown to accommodate a bead clamping structure comprising an upper member 77 and a lower member 78, said members being secured to each other by means of tie-bolts 79, 79.

Figure 11:
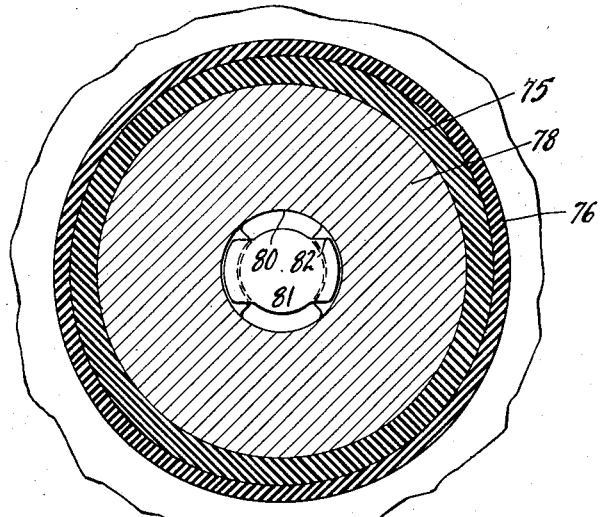
Figure 11 is a section on the line 11—11 of Figure 3.

It is desirable, in the operation of the vulcanizer, that the tire be held stationary during the lifting of the upper mold section so that the tire will be stripped therefrom, and that thereafter the tire will be lifted and stripped from the lower mold section. To this end the bottom face of the lower bead clamping member is formed with an undercut bayonet slot 80 (see Figure 11), and a locking and lifting pin 81 having a T-shaped head 82 adapted to interlock with the bayonet slot 80 is mounted for vertical movement at the axis of the vulcanizer. The lifting pin 81 is slidably mounted in a tubular center pin 83 that is mounted in the lower platen 25, at the axis thereof, and retained therein by a nut 84. The lifting pin 81 is raised and lowered in determinate timed relation to the opening and closing of the vulcanizer by the following mechanism, attention being directed to Figure 6.

Mounted upon the lower end of the lifting pin 81 is a cross-head 87, the respective ends of which are pivotally connected by sliding connections to the horizontal arms 88, 88 of a double bell crank 89 that is fulcrumed at its elbow upon a hinge pin 90 that is supported at its respective ends in the base members 20. The bell crank 89 has a pair of downwardly-extending arms 91, 91 that have forked ends carrying respective swivels 92 (Figure 3), the latter being apertured and constituting supports for one end portion of respective push rods 93, 93 that slide therein, the other ends of said push rods being pivotally mounted upon the front head of the cylinder 59. Each push rod 93 has a collar 94 thereon that is so positioned as to engage the free end of the arm 91 of the bell crank 89 at the approach of the conclusion of the vulcanizer-opening movement of the cylinder 59, and to rock the bell crank as is most clearly shown in Figure 2, whereby the lifting pin 81 is raised to lift and strip the tire 75 from the lower mold section. During the initial opening movement of the vulcanizer the weight of the bead clamping members, lifting pin, and associated mechanism, and friction of the latter is sufficient to hold the work in the lower mold section while the upper section is stripped from the work.

Figure 7:
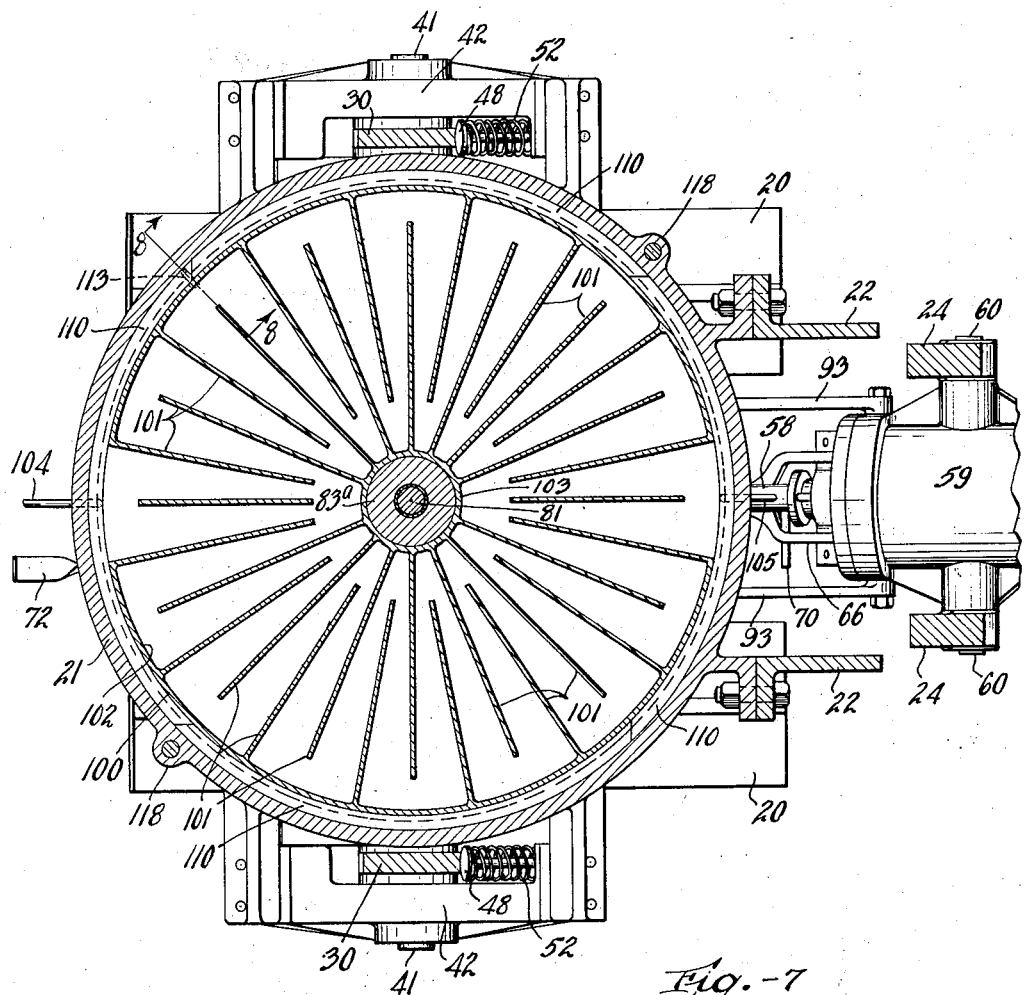
Figure 7 is a section on the line 7—7 of Figure 3.

During the vulcanizing operation it is desirable to draw the mold sections more tightly together than is possible with the locking bars 30, and to this end means is provided for urging the lower mold section 29 axially upward against upper mold section 27. The upper face of the lower platen 21 is formed with a recess 96 in the bottom of which is positioned an annular elastic bag 97 adapted to expand under fluid pressure, a valve stem 98 (Figure 9) being provided for connection to a fluid pressure conduit (not shown). The bag 97 is overlaid with a metal plate 99, and mounted upon the latter is an annular insulator plate 100, the under side of which is formed with a plurality of radial ribs 101, 101 that are integrally connected in alternation to an outer peripheral flange 102 and an inner peripheral flange 103. At diametrically opposite points of the insulator plate 100, the front and rear as shown in Figures 7 and 9, two of the ribs 101 are separated from both flanges 102 and 103 and at one of these points, the front as shown, a fluid cooling medium such as air is delivered into the passages defined by the ribs 101 through an inlet pipe 104 that is threaded into a port extending through the wall of the platen. A similar pipe 105 at the rear is provided for venting fluid from said passages.

Figure 8:
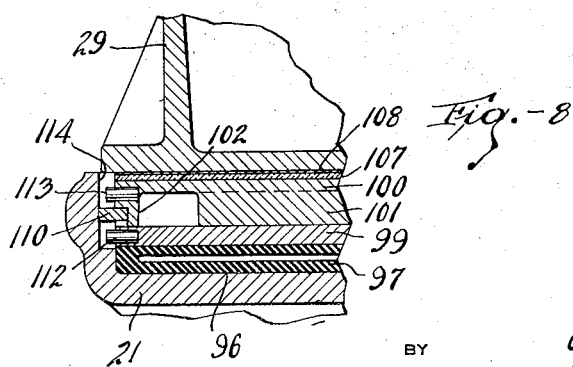
Figure 8 is a section on the line 8—8 of Figure 7.

The arrangement is such that there are two devious passages which extend each way from the inlet port to the outlet port, and thus assure that the entire bottom surface of the plate 99 will be subjected to the cooling influence of the air, the ribs 101 providing additional surface area which is exposed to the cooling medium. The upper surface of the plate 100 is covered with a layer 107 of heat insulating material such as asbestos, and the upper surface of the latter is protected by a thin metal sheet 108. A segmental ring comprising sections 110, 110 is mounted in a suitable circumferential recess in the side of the recess 96, between the plate 99 and the outer peripheral flange 102 of the insulator plate 100, said ring serving to limit the outward movement of the plate 99 at the outer periphery thereof under the force of the expansible bag 97, and serving as a rest for the insulating plate 100 when the bag 97 is deflated. The inner periphery of the plate 99 is beneath the enlarged head 83a of the center pin 83, which head limits the outward movement of the plate 99 at its middle. At one point on the periphery of the plates 99, 100 are radial studs 112, 113 respectively, which extend into a vertical slot 114, Figure 8, formed in the side of the recess 96, said studs preventing angular movement of the plates 99, 100 such as would move the latter out of proper angular position with relation to the fluid inlet and outlet pipes 104, 105.

The lower mold section is supported mainly from its marginal portion which rests upon that portion of the upper side of the platen 21 that circumscribes the recess 96 therein. It is not attached to the platen, and is held against displacement by the center pin 83 which extends into an axial bore 115 in the mold section. In order that the mold section 29 will be properly angularly positioned at all times, the outer periphery of the platen 21 is formed at diametrically opposite points with outstanding ears 118, and rising from each ear is a short post 119. A pair of lugs 120, 120 formed on the mold section 29 are positioned on opposite sides of each post 119 and are provided with adjustment screws 121, 121 that engage the post for the purpose of providing limited angular adjustment of the lower mold section.

Each of the posts 119 has a pin 123 extending through its structure near the top thereof and projecting from opposite sides so as to overlie the lugs 120. The arrangement is such as to prevent the lower mold section 29 from rising but a short distance in the extreme case of adhesion between the mold sections and the work so great as to lift the lower mold section when the upper mold section 27 is lifted.

In the operation of the apparatus, assuming the vulcanizer to be in the open position shown in Figure 2, and the lifting pin 81 to be in its elevated position, an unvulcanized tire 75 with expansible core 76 therein and bead clamping members 77, 78 mounted thereon is placed upon the head 82 of the lifting pin 81 and rotated 90 degrees to cause said head to engage the bayonet slot 80 in bead clamping member 78. The operator then depresses the foot lever 72 to disengage the latch 66 from the collar 68, whereupon the weight of the upper platen and upper mold section causes them to descend, the cylinder 59 moving rearwardly along its piston rod 58 and forcing fluid out of the front end of the cylinder, the latter thereby acting as a dashpot to prevent too rapid descent of the platen and mold section. The rearward movement of the cylinder 59 withdraws the collar 94 from engagement with bell crank 89, whereupon the weight of the lifting pin 81 and work thereon causes them to descend by gravity so that the work is seated in the lower mold section before the upper mold section is fully lowered.

As soon as the mold section 27 is fully lowered, pressure fluid is admitted to the rear end of cylinder 59 to project its piston rod 58 and thereby to turn the rock shaft 41 in counter-clockwise direction as viewed in the drawings.

As the swinging levers 44, that have held the locking bars 30 in retracted or unlocked position, move away from the locking bars, the springs 52 cause the locking bars 30 to follow up and move over center so that their heads 34 enter the undercut slots 31 in the upper platen 25. Continued angular movement of the rock shaft causes the eccentric portions 40 thereof to pull the locking bars downwardly so that the upper mold section is drawn tightly against the lower mold section, thus bringing the various elements of the vulcanizer into the positions shown in Figure 1. Pressure fluid is then admitted to the expansible bag 97 to force the lower mold section upwardly if there is still any play between it and the upper mold section. Preferably the upper and lower mold sections are kept constantly at vulcanizing temperature so that vulcanization starts as soon as the vulcanizer is closed. Cooling fluid is constantly passed between the lower mold section and the bag 97 to prevent deterioration of the latter by heat from the mold.

As soon as vulcanization is completed, the vulcanizer is opened by venting pressure fluid from the rear part of the cylinder 59 and admitting it to the front part thereof. This causes the piston rod 58 to retract and turn the rock shaft 41 in a clockwise direction, the first result of which is to lift the locking bars 30. After the locking bars are lifted, they are engaged by the swinging levers 44 and swung rearwardly, out of engagement with the upper platen 25, against the pressure of the springs 52. As soon as the arm 64 of the sleeve 55 engages the fixed lug 63 of the base member 20, retractive movement of the piston rod 58 ceases and the cylinder 59 moves forwardly along the piston rod, thus lifting the upper platen 25. Forward movement of the cylinder 59 causes the collars 94 on the rods 93 to engage the bell crank 88 and thus to raise the lifting pin 81 to strip the tire 75 from the lower mold cavity to which it normally adheres. Forward movement of the cylinder continues until stopped by its piston at which time the latch 66 has engaged the collar 68 on the piston rod 58. The vulcanized tire is then removed after giving it a quarter turn upon the lifting pin 81, which completes one cycle of operation.

The apparatus is susceptible of modification within the scope of the appended claims which are not limited wholly to the specific construction shown and described.

What is claimed is:—

1. In a vulcanizer, the combination of a lower annular mold section, a complemental, hingedly mounted upper mold section, locking means exteriorly of the mold sections for securing them together, a work-lifting pin disposed axially of the mold sections, a center-pin comprising a journal for said lifting pin, the lower mold section being swiveled upon said center pin, means for adjusting the angular position of the lower mold section, and an expansible member below the lower mold section for urging it upwardly against the upper mold section when the vulcanizer is closed.

2. In a vulcanizer, the combination of a lower mold section, a hinged upper mold section adapted to mate with the lower mold section, means for locking the sections together, an expansible member beneath the lower mold section, a pair of superposed insulating plates between the expansible member and the lower mold member, said plates comprising a devious passage therebetween, means for conducting a cooling fluid to and from said passage, and means for supporting the lower mold section and at least one of the insulating plates independently of the expansible member when the latter is deflated.

3. A combination as defined in claim 2 in which the means for supporting lower mold section and insulating plate consists of a member positioned between the insulating plates constituting a support for the upper plate and limiting upward movement of the lower plate.

4. A combination as defined in claim 2 including studs projecting from the peripheries of the insulating plates and seating in a slot in the side wall of the platen recess for preventing angular movement of said plates.

5. A combination as defined in claim 2 in which the means for supporting the lower mold section and insulation plate consists of a segmental ring projecting from the side wall of the platen recess between the insulating plates to limit the downward movement of the upper plate and the upward movement of the lower plate.

6. In a vulcanizer, the combination of a stationary lower platen, an upper platen movable relatively thereto, a mold section secured to the upper platen, a mold section swiveled on the lower platen, means for locking the platens together with the mold sections in mating relation, expansible means for moving the lower mold section axially toward the upper mold section, and means for adjusting the angular position of the lower mold section with relation to the upper mold section and the lower platen.

7. A combination as defined in claim 6 including means associated with the mold-adjusting means for limiting the axial movement of the lower mold section with relation to the lower platen.

FLORAIN J. SHOOK.